United States Patent
Bennington (10) Patent No.: US 12,259,475 B2
(45) Date of Patent: Mar. 25, 2025

(54) CLOSED-LOOP MOTOR CONTROL USING UNIDIRECTIONAL DATA FEEDBACK

(71) Applicant: LG INNOTEK CO., LTD., Seoul (KR)

(72) Inventor: Dane P. Bennington, Pittsburgh, PA (US)

(73) Assignee: LG INNOTEK CO., LTD., Seoul (KR)

( * ) Notice: Subject to any disclaimer, the term of this patent is extended or adjusted under 35 U.S.C. 154(b) by 125 days.

(21) Appl. No.: 17/217,355

(22) Filed: Mar. 30, 2021

(65) Prior Publication Data

US 2022/0317304 A1 Oct. 6, 2022

(51) Int. Cl.
G01S 17/931 (2020.01)
H02J 50/40 (2016.01)
H04W 52/08 (2009.01)

(52) U.S. Cl.
CPC ............ *G01S 17/931* (2020.01); *H02J 50/40* (2016.02); *H04W 52/08* (2013.01)

(58) Field of Classification Search
CPC ........ G01S 17/931; H02J 50/40; H04W 52/08
USPC .......................................................... 307/9.1
See application file for complete search history.

(56) References Cited

U.S. PATENT DOCUMENTS

| | | |
|---|---|---|
| 5,245,256 A | 9/1993 | Cassat et al. |
| 5,388,176 A | 2/1995 | Dykstra et al. |
| 6,512,199 B1 | 1/2003 | Blazina |
| 7,602,157 B2 | 10/2009 | Babcock et al. |
| 7,659,678 B2 | 2/2010 | Maiocchi |
| 9,628,170 B1 | 4/2017 | Rosenbrand et al. |
| 9,806,658 B2 | 10/2017 | Zeng et al. |
| 10,090,884 B2 | 10/2018 | Ettes et al. |
| 10,338,225 B2 | 7/2019 | Boehmke |
| 2002/0167907 A1 | 11/2002 | Sarkar et al. |

(Continued)

FOREIGN PATENT DOCUMENTS

| | | |
|---|---|---|
| CN | 101729009 A | 6/2010 |
| EP | 4 131 726 A1 | 2/2023 |
| KR | 10-2020-0042704 | 4/2020 |

OTHER PUBLICATIONS

Kolu et al. "3-D Lidar for Mobile Machinery", CAN in Automation (CAN) Newsletter, May 23, 2017, pp. 1-16, Control Engineering, Downers Grove, IL.

(Continued)

*Primary Examiner* — Rexford N Barnie
*Assistant Examiner* — Xuan Ly
(74) *Attorney, Agent, or Firm* — Birch, Stewart, Kolasch & Birch, LLP (57) ABSTRACT

Systems, methods, and computer-readable media are disclosed for closed-loop control of a motor in a LIDAR system over a wireless power interface using data feedback over a unidirectional data communications interface. An example method may include receiving, by a controller on a first portion in a LIDAR system, from a second portion including a second motor, and over a unidirectional data communication interface, data associated with the second motor, wherein the second portion is configured to rotate relative to the first portion. An example method may also include providing, over a wireless power transfer interface, to the second portion, and based on the data, a power signal, wherein the power signal is used to provide power to the second motor.

20 Claims, 4 Drawing Sheets

(56) References Cited

U.S. PATENT DOCUMENTS

| | | |
|---|---|---|
| 2004/0184791 A1 | 9/2004 | Guyett |
| 2011/0216304 A1 | 9/2011 | Hall |
| 2014/0111812 A1 | 4/2014 | Baeg et al. |
| 2019/0027972 A1 | 1/2019 | Gietzold et al. |
| 2020/0025879 A1* | 1/2020 | Pacala .................... G01S 17/42 |
| 2020/0309957 A1* | 10/2020 | Bhaskaran .............. G01S 17/86 |
| 2021/0132229 A1* | 5/2021 | Milkov ................... G01S 17/14 |
| 2021/0181733 A1* | 6/2021 | Nagavalli ........... G06F 11/3692 |
| 2021/0343472 A1 | 11/2021 | Moon |
| 2023/0221412 A1 | 7/2023 | Moon |

OTHER PUBLICATIONS

"An Engineer's Guide to Industrial Robot Designs", 2020, pp. 1-80, Texas Instruments, Dallas, TX.

Ulrich et al. "PIDAR: 3D Laser Range Finder", pp. 1-8, Dept. of Electrical Engineering and Computer Science, University of Central Florida, Orlando, FL.

International Search Report and Written Opinion of the International Searching Authority directed to related International Patent Application No. PCT/US2022/022600, mailed Jul. 21, 2022; 10 pages.

* cited by examiner

CLOSED-LOOP MOTOR CONTROL USING UNIDIRECTIONAL DATA FEEDBACK

BACKGROUND

LIDAR systems may sometimes include one or more non-contact interfaces. Oftentimes, performing data transfer across such interfaces may not be possible using traditional wired data communications. In light of this, one example approach to transfer data across this type of interface may involve the use of slip rings. However, some slip rings are often prone to decay over time. Another approach may include optical data transmissions, which may not face the same decay problems as slip rings, but may require optical transmitters and receivers on either side of the interface to perform the optical transmissions. However, it may not always be desirable to include transmitters and receivers on both sides of the interface, for example, if the physical space available on the one side of the non-contact interface is limited. Additionally, even if a bidirectional communications interface were established, bandwidth limitations may require a half-duplex approach, which may mean that some or all data transmitted in one direction may not be able to be transmitted at the same time as some or all of the data transmitted in the other direction.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure generally relates to, among other things, closed-loop motor control using unidirectional data feedback. The motor may be located downstream from a controller, which may be capable of receiving data pertaining to the operation of the motor and providing power signals to the motor or a motor driver responsible for controlling the speed of the motor. The term "downstream" as used herein may refer to signals being transmitted from a first portion of the LIDAR system that may include a controller, and the term "upstream" as used herein may refer to signals being transmitted from a second portion of the LIDAR system that may include the motor that is providing feedback to the controller on the first portion of the LIDAR system. The controller and motor may also be separated by a non-contact interface. For example, the motor may be located on a first portion, the controller may be located on a second portion, and the first and second portion may be separated by an air gap or other type of medium. As used herein, a "portion" may refer to one or more structural components located on one side of a non-contact interface. Thus, a "first portion" as described herein may not necessarily be limited to one structural component, and a "second portion" may also not necessarily be limited to one structural component. Additionally, different structural components located one portion may rotate in similar or different directions. For example, a LIDAR system may include one or more beam steering mechanisms. A beam steering mechanism may include a light emitter (such as a laser, for example) on a first portion, and a mirror on a second portion. More specifically, the second portion may include a horizontally-rotating structural component and a vertically-rotating structural component. Thus, although technically two "portions" are being described, the second portion in the beam steering mechanism may refer to the combination of the horizontally-rotating and the vertically-rotating structural components located on one side of the non-contact interface between. The first portion including the emitter may be stationary and the structural components on the second portion may be rotated such that when the mirror receives emitted light from the emitter on the first portion, the mirror directs the light in different directions away from the LIDAR system. However, this is merely one example of an element that may include a non-contact interface, and other types of elements may also be included within the LIDAR system that also include non-contact interfaces as well.

In some embodiments, these non-contact interfaces may present difficulties when data transmissions are required to be performed between the two different portions that are separated by the non-contact interface (especially in the case where one portion includes multiple rotating structural elements). For example, because the interface(s) are non-contact interface(s), combined with the fact that one portion on one side of the non-contact interface may be rotating relative to a second portion on the other side of the non-contact interface (or both may be rotating), wired data communications may not be possible. In some cases, to address this, slip rings may be used to allow for data transmission over a given non-contact interface, however, some slip rings are often prone to decay over time. Another approach (the approach described herein) to produce communications over non-contact interfaces may include optical data communications. However, given that the downstream portion may have associated size constraints, physical space may be limited on the downstream portion. In order to establish a bidirectional optical data communications interface over the non-contact interface, an optical transmitter and optical receiver may need to be positioned on both the downstream and upstream portions, which may not be possible given these size constraints (for example, it may not be possible, or may not be desirable, to include both an optical transmitter and an optical receiver on the downstream portion). Additionally, even if a bidirectional communications interface were established, bandwidth limitations may require a half-duplex approach, which may mean that some or all data transmitted in one direction of a communication medium may not be able to be transmitted at the same time as some or all of the data transmitted in the other direction of the communication medium (for example, downstream or upstream).

To allow for the controller to provide control signals to the motor controller based on feedback data associated with the motor (for example, data relating to the operation of the motor, such as a rotational speed of the motor) over a non-contact interface to be performed while still accounting for the size constraints of the downstream portion, as well as potential bandwidth limitations that may require a half-duplex communications scheme, a separate wireless power transfer interface may provide power signals used to control the speed of the motor. Additionally, the data communications interface may be used as a unidirectional data communications channel. That is, instead of controlling the motor using downstream data signals transmitted over the data communications interface (which may require a bidirectional data communications interface), the control signals sent from the controller to the motor controller may instead be sent over the separate wireless power transfer interface. This may allow for a simple, low-latency feedback mechanism that may not require the use of bidirectional data framing or communication protocol delays required to achieve said control. The unidirectional feedback interface may provide a current and continuous speed estimate of the downstream motor, and the controller may then adjust the level of wireless power transfer as according to a control law in order to drive the motor speed to a desired level. In this manner, the motor may be provided power in the downstream direction over the wireless power transfer interface based on feedback provided by the motor in the upstream direction over a unilateral data communications link, instead of the controller providing signals to the motor or motor driver using a downstream data link.

In some embodiments, the downstream wireless power transfer interface may be used to provide a wireless power signal from the controller on a first portion of the non-contact interface to the motor on a second portion of the non-contact interface. The wireless power signal may be an analog voltage signal or a serial pulse width modulation (PWM) signal, to name a few non-limiting examples. The wireless power signal may be transmitted over the non-contact interface using any suitable wireless power transfer mechanism. For example, the wireless power transfer mechanism may be an inductive energy transfer system that may include a primary and a secondary coil with an air gap or other medium (which may be the non-contact interface) between the primary and secondary coil, with the amount of power transfer regulated by an input alternating current (AC) voltage amplitude. In some instances, the wireless power signal may more specifically be provided from the controller to a motor driver on the second portion (for example, physically located on the second portion or operatively connected to the second portion). The motor driver may be physically or operatively connected to the motor such that the motor driver may receive the wireless power signal, and based on the wireless power signal, adjust the speed at which the motor rotates. For example, the motor driver may adjust the speed at which the motor rotates based on the voltage level provided to the motor driver.

In some embodiments, the upstream wireless data transfer interface may provide a data communications interface that may be used to transmit feedback data from the motor to the controller. For example, data pertaining to the speed of rotation of the motor, a rotational position of the motor, or any other data relating to the operation of the motor may be transmitted. In some cases, the upstream wireless data transfer interface may be performed using optical data transfer. In some cases, to perform the optical data transmissions, the transmitting side of the interface (for example, the second portion of the LIDAR system including the motor) may include a light-emitting element, such as a light emitting diode (LED). Likewise, the receiving side of the interface (for example, the first portion of the LIDAR system including the controller) may include a light-detecting element, such as a photodiode. In some cases, multiple light-emitting elements and multiple light-detecting elements may also be used.

Figure 3:
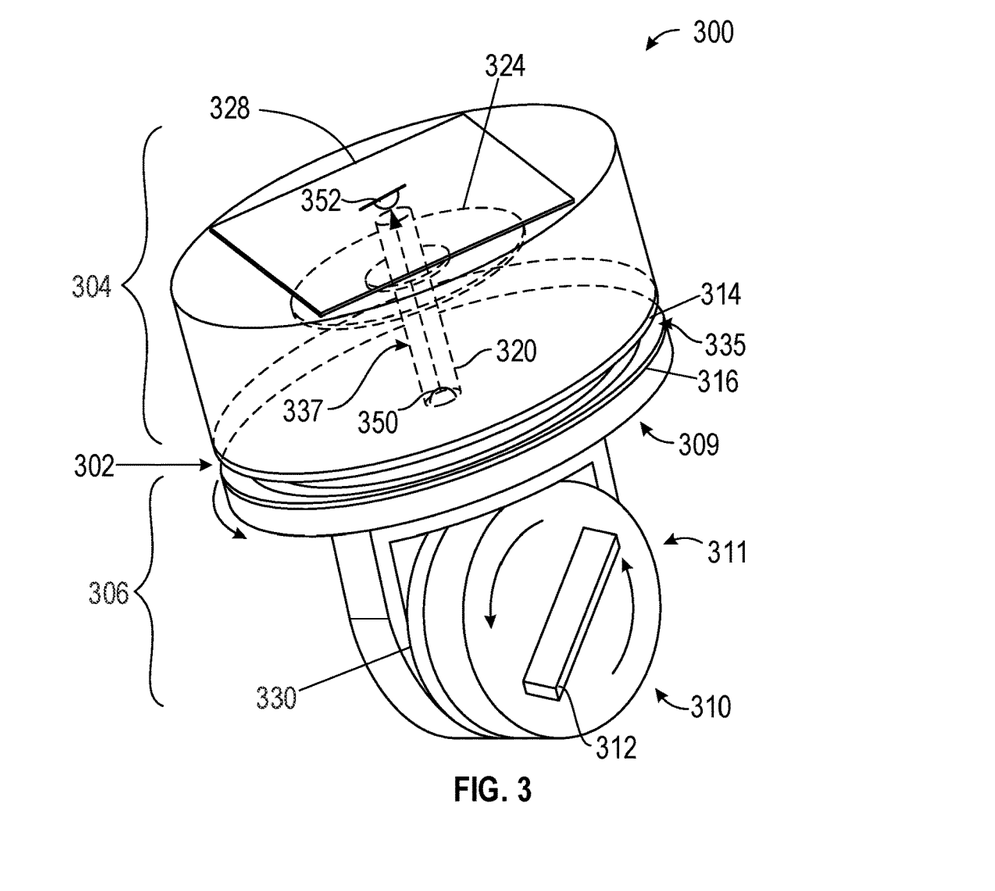
FIG. 3 depicts a schematic illustration of an example system, in accordance with one or more example embodiments of the disclosure.

In some embodiments, the data associated with the operation of the motor that is transmitted using the optical data transfer may be produced one or more optical encoders. A typical optical encoder may include a light-emitting element, a light-detecting element, and/or one or more wheels or discs including a series of tracks including openings at certain intervals around the disc (the light-emitting element and light-detecting element of the optical encoder may be separate from the light-emitting element and light-detecting element used to perform the optical data transfer). The optical encoder may also include a fixed mask that may have a corresponding track for any track on the disc, as well as one or more windows that are cut along the tracks in the mask. As the disc rotates, different windows in the mask are covered or open, which may either prevent light from the light-emitting element from reaching the light-detecting element or may allow the light to pass through the mask to the light-detecting element. Any time light passes through the mask, the optical encoder may output an analog or digital pulse. These pulses may be converted to optical pulses that may be transmitted across the non-contact interface over the upstream wireless data transfer interface, so that they may be received by the controller. If the disc rotates at the same rate as the second portion including the motor, and the openings are placed at known locations on the disc, then the current rotational position of the second portion may be determined at any given time based on when light is detected by the light-detecting element. Additionally, if the position of the second portion is known at various times, the speed of the second portion may be determined as it is rotated by the motor. The light-emitting element, a light-detecting element, and/or wheel or disc may be included in an encoder housing, which may all be located on one portion of the system. For example, as illustrated in FIG. 3 described below, a first optical encoder may be affixed to a shaft that is a part of a second portion of the system. The rotation of the shaft may cause a rotation of the disc of the first optical encoder, which may allow for the optical encoder to function to track the rotation of the second portion as described above. Additional optical encoders may be provided in the system to track the rotation of any other structural components as well.

In some embodiments, the upstream optical data transmissions described herein may involve a modified form of a standard ABI encoder protocol. Standard ABI encoder protocols may involve three different signals, including an "A" signal, a "B" signal, and an "I" signal. The "A" signal may include a square wave, the "B" signal may include a square wave that is 90 degree out of phase with the "A" signal, and the "I" single may include a single pulse. These different signals may be generated based on the different tracks included on the optical data encoder. For example, a first track of openings around the disc may correspond to the "A" signal, and the pulses generated by the optical encoder based on light passing through those opening may form the aforementioned square wave. Similarly, the "B" signal and "I" signal may correspond to other tracks including additional openings. The A signal may provide information about the speed of rotation of the motor, the B signal may provide information about the direction of rotation of the motor (whether the B signal is leading or lagging may provide information about the direction in which the motor is spinning), and the I signal may provide information about when the motor rotates past a given reference position. However, given that the downstream portion including the motor may be limited by size constraints the data bandwidth that may exist over the unidirectional data communications interface may be limited. Thus, it may be desirable to provide sufficient data to the controller to allow for the controller to effectively control the speed of the motor, while also limiting the amount of feedback data that is being transmitted to facilitate the control. In this manner, instead of using an existing ABI encoding protocol, the unidirectional data communications interface described herein may use a modified encoding protocol.

In some embodiments, the modified encoding scheme may include sending the square wave associated with the "A" signal and the "I" signal in the typical ABI encoding protocol, but removing the "B" signal. The B signal may not be necessary if the rotational direction of the motor is previously known. This may be accomplished by either removing the third track associated with the "B" signal from the disc included within the optical encoder, or filtering out output pulses generated based on light passing through the openings in the third track. The modified encoding scheme may combine the A signal and the I signal in a single optical interface (for example, the upstream data communications interface). To allow for both the A and I signals to be encoded in the same interfaces, the high value (for example, peak voltage) associated with each of the signals may be at different voltage levels. For example, the high value associated with the A signal may be 1.5V and the high value associated with the I signal may be 3.0V. Using a window comparator, the two signals may be differentiated. In some cases, the index pulse (the I signal) may correspond to when either the A signal or B signal (depending on construction) goes high. That is, they may go high together. By setting the index pulse as the higher of the two thresholds and assuming there may not be a case when index will be high and the A signal will be low, the two signals can be superimposed to produce a simpler trinary reading with just two comparators instead of the window comparator. Additionally, the A and I signals may be encoded such that they are not a high value at the same time. By using this modified encoding scheme, the data communications interface may use only a single LED and a single photodiode with multiple interfaces. This may reduce space requirements, power requirements, and complexity requirements, which may allow the optical data communications interface to be effectively implemented in the limited-side downstream portion including the motor.

Figure 1:
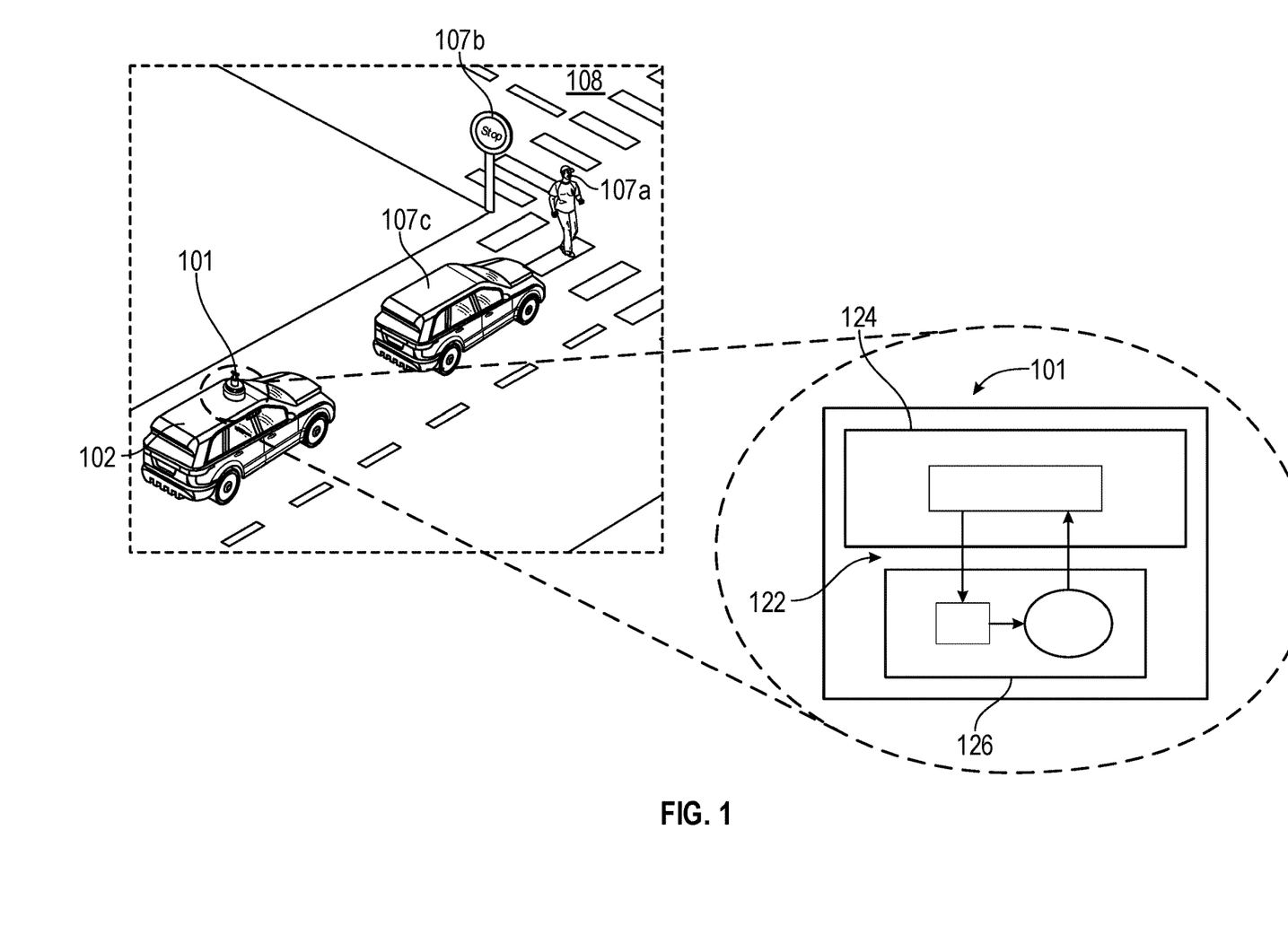
FIG. 1 depicts a schematic illustration of an example system, in accordance with one or more example embodiments of the disclosure.

Turning to the figures, FIG. 1 includes a schematic diagram of an example system 101. The system 101 may be a LIDAR system, and may be implemented on a vehicle, such as the vehicle 102 as illustrated in the figure. For consistency sake, the system 101 may be referred to as a "LIDAR system 101" herein, however, the system may also be any other type of system and may be a standalone system, or may be implemented on any other type of object or system as well (rather than being implemented on a vehicle). Additionally, external to the system 101 may be an environment 108 that may include one or more objects (for example, a pedestrian 107a, a stop sign 107b, another vehicle 107c, and/or any other number and/or types of objects as well).

The exemplary LIDAR system 101 may include at least one non-contact interface 122 as described above. The non-contact interface 122 may serve as an interface between two portions within the LIDAR system, such as a first portion 124 and/or a second portion 126. That is, the non-contact interface 122 may be an air gap (or other type of medium) that separates the first portion 124 from the second portion 216. The non-contact interface 122, first portion 124, and second portion 126, as well as any elements included on the first portion 124 and/or second portion 126 may be described in further detail with respect to FIGS. 2 and 3. The first portion 124 and/or the second portion may not necessarily comprise the entire LIDAR system 101, but may simply be an example of two portions within the LIDAR system 101 that may be separated by a non-contact interface 122. As used herein, a "portion" may refer to one or more structural components located on one side of a non-contact interface. Thus, a "first portion" as described herein may not necessarily be limited to one structural component, and a "second portion" may also not necessarily be limited to one structural component. For example, the LIDAR system 101 may include one or more beam steering mechanisms. A beam steering mechanism (not depicted in the figure) may include a light emitter (such as a laser, for example) on a first portion, and a mirror on a second portion. More specifically, the second portion may include a horizontally-rotating structural component and a vertically-rotating structural component. Thus, although technically two "portions" are being described, the second portion in the beam steering mechanism may refer to the combination of the horizontally-rotating and the vertically-rotating structural components located on one side of the non-contact interface between. The first portion including the emitter may be stationary and the structural components on the second portion may be rotated such that when the mirror receives emitted light from the emitter on the first portion, the mirror directs the light in different directions away from the LIDAR system. For consistency sake, reference may be made herein to a LIDAR system that includes a "first portion" and a "second portion." However, this is merely an example, and the systems and methods described herein may similarly apply to any other two portions of a LIDAR system that may rotate relative to one another or independently of one another, or any non-contact interface in general.

Figure 2:
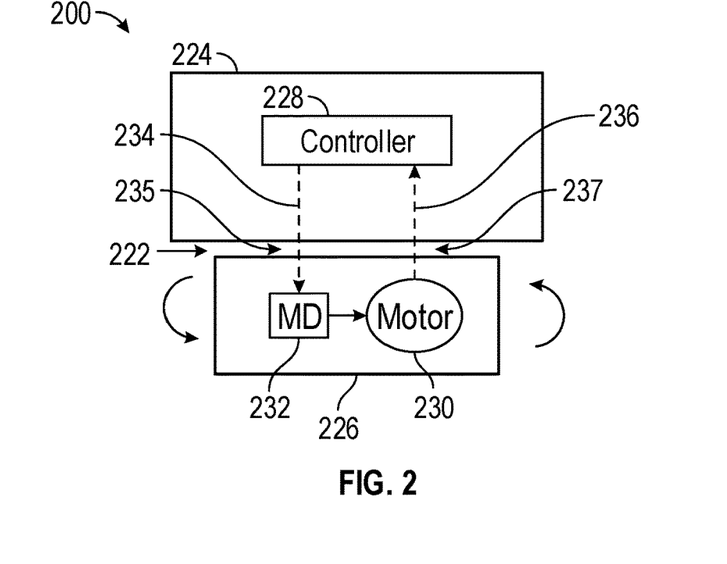
FIG. 2 depicts a schematic illustration of an example system, in accordance with one or more example embodiments of the disclosure.

FIG. 2 depicts a schematic diagram of an example system 200. In some cases, the example system 200 may include the same, or similar, elements depicted within the LIDAR system 101 of FIG. 1. That is, the system 200 may include a non-contact interface 222 that may separate a first portion 224 and/or a second portion 226. The system 200, for example, may be a beam steering mechanism as mentioned with respect to FIG. 1, however, other types of non-contact interfaces may also exist in the LIDAR system, such as an interface between a rotating sensor head of the LIDAR system and a fixed portion of the LIDAR system that is directly affixed to a vehicle. Additionally, a LIDAR system may include more than one non-contact interface between two portions. The system 200 may also include one or more interfaces between the first portion 224 and second portion 226 through which signals may be transmitted. As used herein, a "portion" may refer to one or more structural components located on one side of a non-contact interface. Thus, even though this may not necessarily be illustrated in the figure, the first portion 224 may not necessarily be limited to one structural component, and the second portion 226 may also not necessarily be limited to one structural component. Additionally, different structural components located one portion may rotate in similar or different directions. This may be further illustrated in FIG. 3 described below.

In some embodiments, a first interface may include a downstream wireless power transfer interface 235 and a second interface may include an upstream wireless data transfer interface 237 (which may be the unidirectional data communications interface as described herein). That is, the non-contact interface 222 may refer to an air gap (or other type of medium) between the first portion 224 and the second portion 226, and the downstream wireless power transfer interface 235 and upstream wireless data transfer interface 237 may be channels through which wireless signals (power or data) may be transmitted over the non-contact interface 222 between the first portion 224 and the second portion 226. In other words, the term "interface" as used in the non-contact interface 202 may refer to a physical separation between the first portion 224 and second portion 226 and the use of this term with respect to the downstream wireless power transfer interface 235 and upstream wireless data transfer interface 237 may refer to portions of the system 200 through which power and/or data signals may be transmitted. For example, the upstream wireless data transfer interface 237 may be an optical transmission interface using a light transmitter and a light receiver as is described in more detail below. Additionally, it should be noted that while the downstream wireless power transfer interface 235 and the upstream wireless data transfer interface 237 may be illustrated as being located on certain portions of the system 200, these illustrated locations may not necessarily represent the actual physical locations of the downstream wireless power transfer interface 235 and the upstream wireless data transfer interface 237 on the system 200. That is, the locations of the downstream wireless power transfer interface 235 and the upstream wireless data transfer interface 237 as illustrated in FIG. 2 may simply be used to illustrate that the downstream wireless power transfer interface 235 may include power signal transmissions in the downstream direction from the first portion 224 to the second portion 226, and the upstream wireless data transfer interface 237 may include optical signal transmissions in the upstream direction from the second portion 226 to the first portion 224. FIG. 3 may provide a more detailed example of where these interfaces may possibly be implemented (however, FIG. 3 may also just be for exemplary purposes and not intended to be limiting).

In some embodiments, the second portion 226 may include a motor 230 and/or a motor driver 232. The motor may be used to rotate the second portion 226 with respect to the first portion 224. The motor driver 232 may be used to adjust the speed at which the motor rotates the second portion 226. The motor driver 232 may determine how to adjust the speed at which the motor rotates based on an wireless power signal 234 received from a controller 228 (which may include any of the elements of the computing system 500 described with respect to FIG. 5 below) on the first portion 224. The wireless power signal 234 may be received from the controller 228 over a power transfer interface 235.

In some embodiments, first portion 224 may include the controller 228. The controller 228 may be configured to receive feedback data associated with the operation of motor 230, and may include any elements described with respect to the computing system 500 of FIG. 5. The feedback data 236 may be received over a data communications interface 237. The first portion 224 may also optionally include a motor as well (not depicted in the figure), as well as any other element. However, in other cases, these elements may not necessarily be present on the first portion. The first portion may be described herein as being "upstream" from the second portion. As used herein, "upstream" may refer to the first portion providing power signal and receiving.

In some embodiments, the downstream wireless power transfer interface 235 may be used to provide a wireless power signal 234 from the controller 228 on the first portion 224 to the motor 230 on the second portion 226. The wireless power signal 234 may be an analog voltage signal or a serial PWM signal, to name a few non-limiting examples. The wireless power signal 234 may be transmitted over the wireless power transfer interface using any suitable method, such as inductive or capacitive coupling, for example. In some instances, the wireless power signal 234 may more specifically be provided from the controller 228 to the motor driver 232 on the second portion 226. The motor driver 232 may be connected to the motor 230 such that the motor driver 232 may receive the wireless power signal 234, and based on the wireless power signal 234, adjust the speed at which the motor 230 rotates. For example, the motor driver 232 may adjust the speed at which the motor 230 rotates based on the voltage level provided to the motor driver 232 by the controller 228.

In some embodiments, the upstream wireless data transfer interface 327 may provide a data communications interface that may be used to transmit feedback data 236 from the motor 230 to the controller 228. For example, data pertaining to the speed of rotation of the motor, a rotational position of the motor, or any other data relating to the operation of the motor may be transmitted. In some cases, the upstream wireless data transfer interface may be performed using optical data transfer. In some cases, to perform the optical data transmissions, the transmitting side of the interface (for example, the second portion 226 of the LIDAR system including the motor 230) may include a light-emitting element, such as a light emitting diode (LED). Likewise, the receiving side of the interface (for example, the first portion 224 of the LIDAR system including the controller 228) may include a light-detecting element, such as a photodiode. In some cases, multiple light-emitting elements and multiple light-detecting elements may also be used as well. In some embodiments, the data associated with the operation of the motor 230 that is transmitted using the optical data transfer may be produced one or more optical encoders (not depicted in the figure). The operation of these optical encoders, as well as the manner in which data produced by the optical encoders may be transmitted to the controller, may be described below with respect to FIG. 3.

FIG. 3 depicts a schematic diagram of an example system 300. The system 300 may be the same as, or similar to, the system 200, but may be presented from an isometric perspective (and/or may include additional exemplary structural details) to provide further detail, such as, for example, with respect to the optical encoders (for example, the first optical encoder 324 and the second optical encoder 330). That is, the system 300 may include a controller 328 on a first portion 304 and a motor 310 located on a second portion 306. The controller 328 may also be provided on the first portion 304 in any other location other than the location illustrated in the figure as well. The motor 310 may be controlled by a motor driver (not shown in the figure). The controller 328, first portion 304, second portion 306, motor driver, and/or the motor 310 may be similar to controller 228, first portion 224, second portion 226, motor driver 232, and/or motor 230). It should also be noted that the system 300 may specifically depict a beam-steering mechanism to illustrate an element within a LIDAR system that may include a non-contact interface 302. For example, the second portion 306 may include a horizontally-rotating structural component 309 and a vertically-rotating structural component 311, and the vertically-rotating structural component 311 may include a mirror 312. However, these elements (the horizontally-rotating structural component 309, the vertically-rotating structural component 311, and the mirror 312) may be specific to beam-steering mechanism, and may not necessarily be included in other elements including a non-contact interface 302 (rather they may be provided for exemplary purposes to illustrate components of a beam-steering mechanism). Additionally, the second portion 306 may also comprise a shaft 320 that may extend upwards inside of the first portion 304 (as illustrated by the dashed lines representing the shaft 320).

In some embodiments, the system 300 may include a wireless power transfer interface 335 that may include a first wireless power transformer 314 on the first portion 304 and a second wireless power transformer 316 on the second portion 306. The wireless power transfer interface 335 may be illustrated as comprising the entirety of the two surfaces of the first portion 304 and second portion 306 on either side of the air gap forming the non-contact interface 302, however, the wireless power transfer interface 335 may also only include some of these respective surfaces as well. The first wireless power transformer 314 and second wireless power transformer 316 may form an inductive energy transfer system that includes a primary and a secondary coil with an air gap between (which may be the non-contact interface 302). In this manner, the wireless power interface may be used to provide power signals from the controller 328 to the motor driver, which may then use the power signals to adjust a speed of the motor 310 (or other parameters of the motor 310).

The system 300 may also depict an upstream wireless data transfer interface 337, which may be the same as, or similar to, wireless data transfer interface 237 illustrated in FIG. 2. In some embodiments, the upstream wireless data transfer interface 337 may provide a data communications interface that may be used to transmit feedback data from the motor 310 to the controller 328. For example, data pertaining to the speed of rotation of the motor 310, a rotational position of the motor 310, or any other data relating to the operation of the motor 310 may be transmitted. In some cases, the upstream wireless data transfer interface 337 may be performed using optical data transfer. In some cases, to perform the optical data transmissions, the transmitting side of the interface (for example, the second portion of the LIDAR system including the motor) may include a light-emitting element 350, such as a light emitting diode (LED). Likewise, the receiving side of the interface (for example, the first portion of the LIDAR system including the controller) may include a light-detecting element 352, such as a photodiode. In some cases, multiple light-emitting elements and multiple light-detecting elements may also be used as well.

In some embodiments, the data associated with the operation of the motor 310 that is transmitted using the upstream wireless data transfer interface 337 may be produced one or more optical encoders (for example, a first optical encoder 324 and/or a second optical encoder 330, as well as any other number of optical encoders). A typical optical encoder may include a light-emitting element, a light-detecting element, and/or one or more wheels or discs including a series of tracks including openings at certain intervals around the disc (the light-emitting element and light-detecting element of the optical encoder may be separate from the light-emitting element 350 and light-detecting element 352 used to perform the optical data transfer). The optical encoder may also include a fixed mask that may have a corresponding track for every track on the disc, as well as one or more windows that are cut along the tracks in the mask. As the disc rotates, different windows in the mask are covered or open, which may either prevent light from the light-emitting element from reaching the light-detecting element or may allow the light to pass through the mask to the light-detecting element. Each time light passes through the mask, the optical encoder may output an associated analog or digital pulse. These pulses may be converted to optical pulses that may be transmitted across the non-contact interface over the upstream wireless data transfer interface 337, so that they may be received by the controller. As depicted in the figure, the upstream wireless data transfer interface 337 may be included within the shaft 320 of the second portion 306 (however, the upstream wireless data transfer interface 337 may similarly be included on any other portion of the system 300 as well). If the disc rotates at the same rate as the second portion including the motor, and the openings are placed at known locations on the disc, then the current rotational position of the second portion may be determined at any given time based on when light is detected by the light-detecting element. Additionally, if the position of the second portion is known at various times, the speed of the second portion may be determined as it is rotated by the motor. The light-emitting element, a light-detecting element, and/or wheel or disc may be included in an encoder housing, which may all be located on one portion of the system. For example, as illustrated in the figure, a first optical encoder 324 may be affixed to the shaft 320 that is a part of a second portion 306 of the system 300. The rotation of the shaft 320 may cause a rotation of the disc of the first optical encoder 324, which may allow for the first optical encoder 324 to function to track the rotation of the second portion 306 as described above. Additional optical encoders may be provided in the system to track the rotation of any other structural components as well. For example, the system 300 may also include a second optical encoder 330. The second optical encoder 330 may be provided on the vertically-rotating structural component 311 of the second portion 306. The second optical encoder 330 may function similarly to the first optical encoder 324, but may instead provide information about the rotation of the vertically-rotating structural component 311 of the second portion 306 instead of the horizontally-rotating structural component 309. This information may also be provided to the controller 328, which may then use the information to control the speed of the motor 311 as described herein. In this manner, the controller 328 may have information about the rotation of any downstream elements, such as the horizontally-rotating structural component 309 and/or the vertically-rotating structural component 311.

Figure 4:
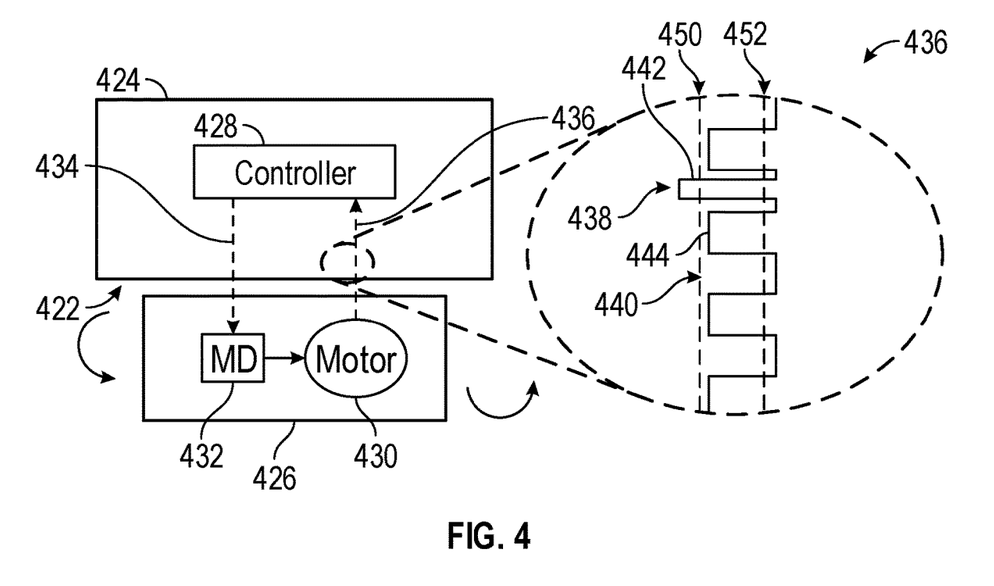
FIG. 4 depicts a schematic illustration of an encoding scheme, in accordance with one or more example embodiments of the disclosure.

FIG. 4 depicts a schematic illustration of an encoding scheme that may be implemented in an upstream data communications interface 436 of a system 400. The system 400 may be the same as, or similar to, the system 200 described with respect to FIG. 2. That is, the system 400 may include a first portion 244 and a second portion 426 separated by a non-contact interface 422. The first portion 424 may include a controller 428 and the second portion may include a motor 430 and/or a motor driver 432. The system 400 may include a downstream wireless power transfer interface 235 and an upstream wireless data transfer interface 237. In some embodiments, the upstream optical data transmissions described herein may involve a modified form of a standard ABI encoder protocol. Standard ABI encoder protocols may involve three different signals. The "A" signal may include a square wave, the "B" signal may include a square wave that is 90 degree out of phase with the "A" signal, and the "I" single may include a single pulse. The A signal may provide information about the speed of rotation of the motor, the B signal may provide information about the direction of rotation of the motor (whether the B signal is leading or lagging may provide information about the direction in which the motor is spinning), and the I signal may provide information about when the motor rotates past a given reference position. However, given that the downstream portion including the motor may be limited by size constraints the data bandwidth that may exist over the unidirectional data communications interface may be limited. Thus, it may be desirable to provide sufficient data to the controller to allow for the controller to effectively control the speed of the motor, while also limiting the amount of feedback data that is being transmitted to allow the control to happen. Thus, instead of using the traditional ABI encoding protocol, the unidirectional data communications interface described herein may use a modified encoding protocol.

In some embodiments, the modified encoding scheme may include sending the square wave associated with the "A" signal 440 and the "I" signal 438 in the typical ABI encoding protocol, but removing the "B" signal. The B signal may not be necessary if the rotational direction of the motor is previously known. The modified encoding scheme may combine the A signal 440 and the I signal 438 in a single optical interface (for example, the upstream data communications interface 436). To allow for both the A and I signals to be encoded in the same interface, the high value 444 associated with the A signal 440 and the high value 442 associated with the I signal 438 may be at different power levels. For example, the figure may depict the high value 442 of the I signal 438 being transmitted at a greater power level than the high value 444 associated with the A signal 440. One non-limiting example may be to transmit the A signal 440 by driving the LED at 50 mA and the I signal by driving the LED at 100 mA, but any other values may also be used. The controller 428 may use particular thresholds to be able to distinguish the A signal 440 from the I signal 438. For example, a first threshold 450 may be used to identify the I signal 438 and a second threshold may be used to identify the A signal 440. If the signal is above the first threshold 450, then it may be determined to be the I signal 438. If the signal is below the first threshold 450 and above the second threshold 452, then the signal may be the A signal 440. Additionally, the A and I signals may be encoded such that they are not a high value at the same time. Running signal into a photodetector with two interfaces. By using this modified encoding scheme, the upstream data communications interface 436 may be created using only a single LED and a single photodiode with multiple interfaces. This may reduce space requirements, power requirements, and complexity requirements, which may allow the optical data communications interface to be effectively implemented in the limited-side downstream portion (the second portion 426) including the motor 430.

Figure 5:
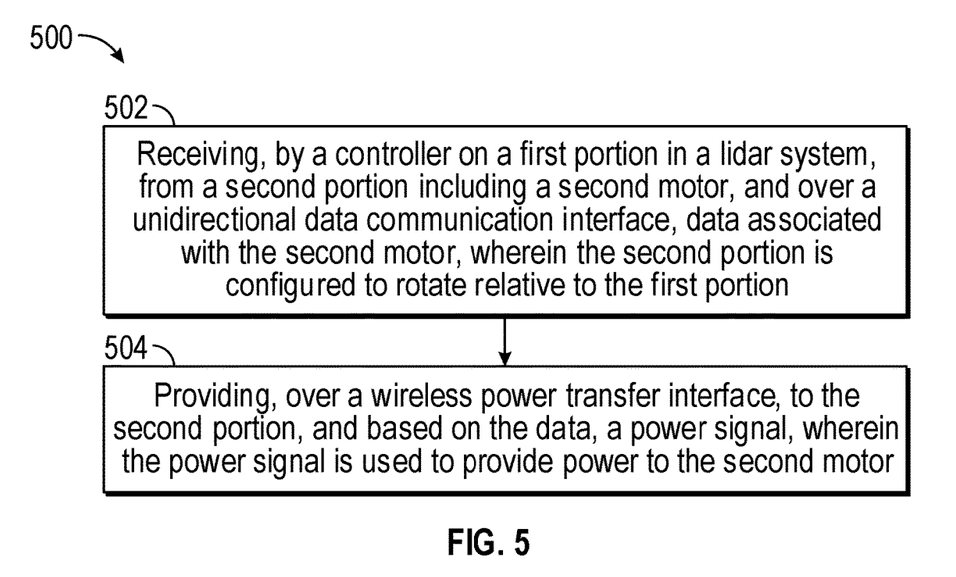
FIG. 5 depicts an example method, in accordance with one or more example embodiments of the disclosure.

FIG. 5 is an example method 500. At block 502 of the method 500 in FIG. 5, the method may include receiving, by a controller on a first portion in a LIDAR system, from a second portion including a second motor, and over a unidirectional data communication interface, data associated with the second motor, wherein the second portion is configured to rotate relative to the first portion. At block 504, the method 500 may include providing, over a wireless power transfer interface, to the second portion, and based on the data, a power signal, wherein the power signal is used to provide power to the second motor.

In some embodiments, the method 500 may also include adjusting, based on the data, the power signal provided over the wireless power transfer interface, wherein the power signal is at least one of: an analog voltage or a pulse-width modulation (PWM) signal. In some embodiments, the data includes a speed of the second motor, and wherein the data communication interface is an optical data interface, wherein the optical data interface includes a light emitting diode (LED) at the second portion and a photodetector at the first portion, the photodetector including two input interfaces. In some embodiments, the data includes a first square wave and a first pulse, wherein the square wave provides position information associated with the second motor, wherein the pulse provides information about a single position associated with the second motor, and wherein the square wave is a first high value at a first time and the pulse is a second high value at a second time, and wherein the first high value is different than the second high value.

Figure 6:
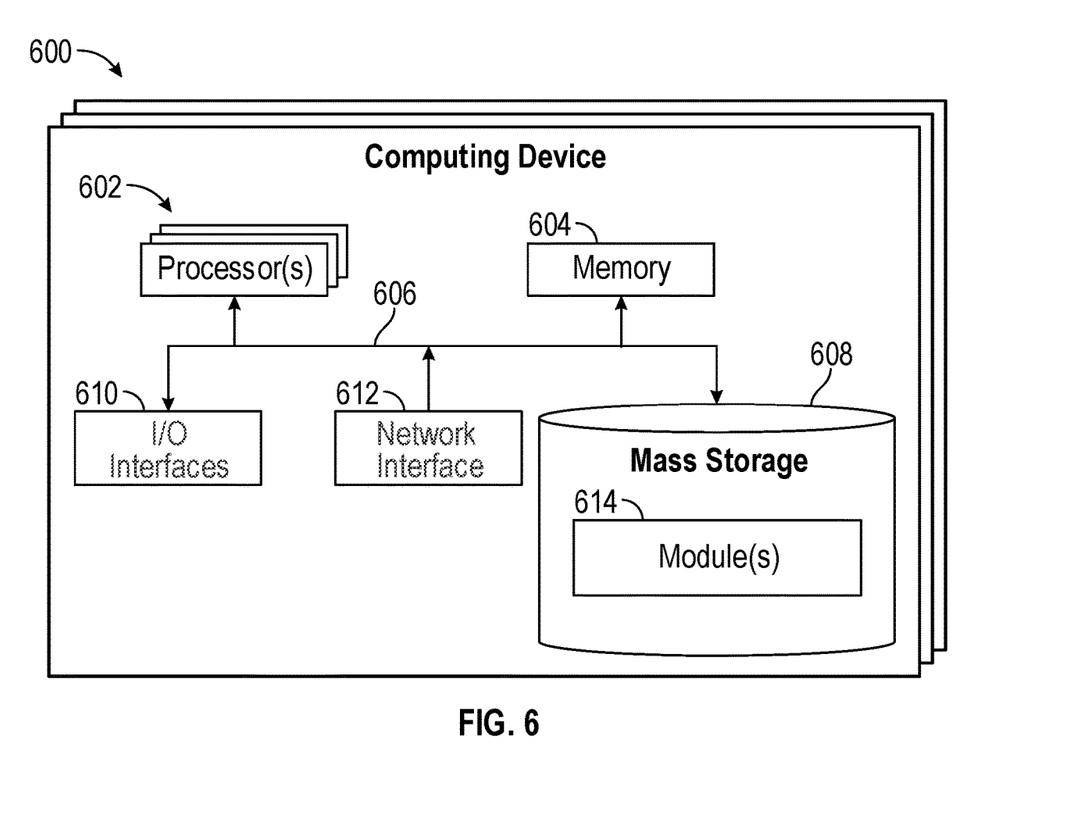
FIG. 6 depicts a schematic illustration of an example computing device architecture, in accordance with one or more example embodiments of the disclosure.

FIG. 6 illustrates an example computing device 600, in accordance with one or more embodiments of this disclosure. The computing 600 device may be representative of any number of elements described herein, such as any of the controllers, and/or any other element described herein. The computing device 600 may include at least one processor 602 that executes instructions that are stored in one or more memory devices (referred to as memory 604). The instructions can be, for instance, instructions for implementing functionality described as being carried out by one or more modules and systems disclosed above or instructions for implementing one or more of the methods disclosed above. The processor(s) 602 can be embodied in, for example, a CPU, multiple CPUs, a GPU, multiple GPUs, a TPU, multiple TPUs, a multi-core processor, a combination thereof, and the like. In some embodiments, the processor(s) 602 can be arranged in a single processing device. In other embodiments, the processor(s) 602 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) portion; and parallel computing portions with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 602 can access the memory 604 by means of a communication architecture 606 (e.g., a system bus). The communication architecture 606 may be suitable for the particular arrangement (localized or distributed) and type of the processor(s) 602. In some embodiments, the communication architecture 606 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Interface Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile discs (DVDs) or other optical storage, magnetic cassettes, magnetic tape, magnetic disc storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 604 also can retain data.

Each computing device 600 also can include mass storage 608 that is accessible by the processor(s) 602 by means of the communication architecture 606. The mass storage 608 can include machine-accessible instructions (e.g., computer-readable instructions and/or computer-executable instructions). In some embodiments, the machine-accessible instructions may be encoded in the mass storage 608 and can be arranged in components that can be built (e.g., linked and compiled) and retained in computer-executable form in the mass storage 608 or in one or more other machine-accessible non-transitory storage media included in the computing device 600. Such components can embody, or can constitute, one or many of the various modules disclosed herein. Such modules are illustrated as modules 614. In some instances, the modules may also be included within the memory 604 as well.

Execution of the modules 614, individually or in combination, by at least one of the processor(s) 602, can cause the computing device 600 to perform any of the operations described herein (for example, the operations described with respect to FIG. 5, as well as any other operations).

Each computing device 600 also can include one or more input/output interface devices 610 (referred to as I/O interface 610) that can permit or otherwise facilitate external devices to communicate with the computing device 600. For instance, the I/O interface 610 may be used to receive and send data and/or instructions from and to an external computing device.

The computing device 600 also includes one or more network interface devices 612 (referred to as network interface(s) 612) that can permit or otherwise facilitate functionally coupling the computing device 600 with one or more external devices. Functionally coupling the computing device 600 to an external device can include establishing a wireline connection or a wireless connection between the computing device 600 and the external device. The network interface devices 612 can include one or many antennas and a communication processing device that can permit wireless communication between the computing device 600 and another external device. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A LIDAR system comprising:
a first portion including a controller, the controller including a processor;
a second portion including a motor, wherein the second portion rotates relative to the first portion, and wherein the first portion and second portion are separated by a non-contact interface;
a wireless power transfer interface between the first portion and the second portion that provides a power signal in a downstream direction from the first portion to the second portion, wherein the power signal is used to adjust a speed of the motor; and
a unidirectional data communication interface between the first portion and the second portion that provides upstream data indicative of the speed of the motor and a position of the motor to the controller, wherein the upstream data is encoded to remove data indicative of a direction of rotation of the motor,
wherein if the data indicative of the direction of rotation of the motor is variable, the controller is configured to generate the data indicative of the direction of rotation of the motor based on the data indicative of the position of the motor included in the upstream data.

2. A LIDAR system comprising:
a first portion including a controller, the controller including a processor;
a second portion including a motor, wherein the second portion rotates relative to the first portion, and wherein the first portion and second portion are separated by a non-contact interface;
a wireless power transfer interface between the first portion and the second portion that provides a power signal in a downstream direction from the first portion to the second portion, wherein the power signal is used to adjust a speed of the motor; and
a unidirectional data communication interface between the first portion and the second portion that provides upstream data indicative of the speed of the motor and a position of the motor to the controller, wherein the upstream data is encoded to remove data indicative of a direction of rotation of the motor,
wherein the upstream data comprises data indicative of the speed of the motor superimposed with data indicative of the position of the motor to form a ternary signal that is provided to the controller, and
wherein the data indicative of the direction of rotation of the motor is removed from the encoded upstream data if known by previous upstream data.

3. The LIDAR system of claim 1, wherein the upstream data comprises data captured using a first optical encoder associated with the second portion.

4. The LIDAR system of claim 1, wherein the unidirectional data communication interface comprises an optical data interface, wherein the optical data interface comprises a light emitting diode (LED) at the second portion and a photodetector at the first portion, the photodetector including two input interfaces.

5. The LIDAR system of claim 1, wherein the second portion comprises a first structural component and a second structural component, wherein the first structural component rotates relative to the second structural component, and wherein the second structural component further comprises a second optical encoder.

6. The LIDAR system of claim 1, wherein the encoded upstream data includes a first square wave and a first pulse, wherein the square wave provides information for the motor and the pulse provides information indicative of the position of the motor.

7. The LIDAR system of claim 6, wherein the square wave is a first high value at a first time and the pulse is a second high value at a second time, and wherein the first high value is different than the second high value.

8. The LIDAR system of claim 1, wherein the second portion further includes a motor driver that receives the power signal over the wireless power transfer interface, and provides a power level to the motor based on the power signal, wherein the power signal is at least one of: an analog voltage or a pulse-width modulation (PWM) signal.

9. A controller comprising:
a computer processor operable to execute a set of computer-readable instructions; and
a memory operable to store the set of computer-readable instructions operable to:
receive, at a first portion of a LIDAR system, from a second portion of the LIDA system that includes a motor, via a unidirectional data communication interface, upstream data indicative of a speed of the motor and a position of the motor that is encoded to remove data indicative of a direction of rotation of the motor, wherein if the data indicative of the direction of rotation of the motor is variable, the controller is configured to generate the data indicative of the direction of rotation of the motor based on the data indicative of the position of the motor included in the upstream data and wherein the second portion rotates relative to the first portion; and
provide, over a wireless power transfer interface, to the second portion, and based on the encoded upstream data, a power signal used to adjust the speed of the motor.

10. A controller comprising:
a computer processor operable to execute a set of computer-readable instructions; and
a memory operable to store the set of computer-readable instructions operable to:
receive, at a first portion of a LIDAR system, from a second portion of the LIDA system that includes a motor, via a unidirectional data communication interface, upstream data indicative of a speed of the motor and a position of the motor that is encoded to remove data indicative of a direction of rotation of the motor and wherein the second portion rotates relative to the first portion;
superimpose data indicative of the speed of the motor with data indicative of the position of the motor to form a ternary signal, and
wherein the data indicative of the direction of rotation of the motor is removed from the encoded upstream data if known by previous upstream data; and
provide, over a wireless power transfer interface, to the second portion, and based on the encoded upstream data, a power signal used to adjust the speed of the motor.

11. The controller of claim 9, wherein the upstream data is captured using a first optical encoder associated with the second portion.

12. The controller of claim 9, wherein the unidirectional data communication interface comprises an optical data interface, wherein the optical data interface comprises a light emitting diode (LED) at the second portion and a photodetector at the first portion that comprises two input interfaces.

13. The controller of claim 12, wherein the second portion comprises a first structural component and a second structural component, wherein the first structural component rotates relative to the second structural component, and wherein the second structural component further comprises a second optical encoder.

14. The controller of claim 9, wherein the encoded upstream data includes a first square wave and a first pulse, wherein the square wave provides information for the motor and the pulse provides information indicative of the position of the motor.

15. The controller of claim 14, wherein the square wave is a first high value at a first time and the pulse is a second high value at a second time, and wherein the first high value is different than the second high value.

16. The controller of claim 9, wherein the second portion further includes a motor driver that receives the power signal over the wireless power transfer interface, and provides a power level to the motor based on the power signal, wherein the power signal is at least one of: an analog voltage or a pulse-width modulation (PWM) signal.

17. A method comprising:
receiving, by a controller on a first portion in a LIDAR system, from a second portion including a motor, and via a unidirectional data communication interface, upstream data indicative of a speed of the motor and a position of the motor that is encoded to remove data indicative of a direction of rotation of the motor, wherein if the data indicative of the direction of rotation of the motor is variable, the controller is configured to generate the data indicative of the direction of rotation of the motor based on the data indicative of the position of the motor included in the upstream data and wherein the second portion rotates relative to the first portion; and
providing, via a wireless power transfer interface, to the second portion, and based on the encoded upstream data, a power signal used to provide power to the motor.

18. The method of claim 17, further comprising:
adjusting, based on the encoded upstream data, the power signal, wherein the power signal is at least one of: an analog voltage or a pulse-width modulation (PWM) signal.

19. A method comprising:
receiving, by a controller on a first portion in a LIDAR system, from a second portion including a motor, and via a unidirectional data communication interface, upstream data indicative of a speed of the motor and a position of the motor that is encoded to remove data indicative of a direction of rotation of the motor,
wherein the encoded upstream data includes a first square wave and a first pulse, wherein the square wave provides information for the motor and the pulse provides information indicative of the position of the motor,
wherein the square wave is a first high value at a first time and the pulse is a second high value at a second time, and wherein the first high value is different than the second high value,
wherein the data indicative of the direction of rotation of the motor is removed from the encoded upstream data if known by previous upstream data, wherein the second portion rotates relative to the first portion; and providing, via a wireless power transfer interface, to the second portion, and based on the encoded upstream data, a power signal used to provide power to the motor.

20. The LIDAR system of claim 1, wherein the motor is within the second portion and spaced from the first portion.

\* \* \* \* \*